United States Patent
Kibutu

(10) Patent No.: US 10,680,869 B2
(45) Date of Patent: Jun. 9, 2020

(54) MODEM APPARATUS, COMMUNICATIONS SYSTEM AND METHOD OF PROCESSING SUBCARRIERS

(71) Applicant: u-blox AG, Thalwil (CH)

(72) Inventor: Peter Mutitika Kibutu, Cambridge (GB)

(73) Assignee: u-box AG, Thalwil (CH)

( * ) Notice: Subject to any disclaimer, the term of this patent is extended or adjusted under 35 U.S.C. 154(b) by 0 days.

(21) Appl. No.: 15/752,930

(22) PCT Filed: Aug. 25, 2015

(86) PCT No.: PCT/EP2015/069457
§ 371 (c)(1),
(2) Date: Feb. 15, 2018

(87) PCT Pub. No.: WO2017/032411
PCT Pub. Date: Mar. 2, 2017

(65) Prior Publication Data
US 2019/0007250 A1 Jan. 3, 2019

(51) Int. Cl.
*H04L 27/26* (2006.01)
*H04L 5/14* (2006.01)
(Continued)

(52) U.S. Cl.
CPC .......... *H04L 27/2636* (2013.01); *H04L 5/143* (2013.01); *H04L 27/265* (2013.01);
(Continued)

(58) Field of Classification Search
CPC . H04L 5/143; H04L 27/2626; H04L 27/2647; H04L 27/2636; H04L 27/265;
(Continued)

(56) References Cited

U.S. PATENT DOCUMENTS

2013/0005403 A1\* 1/2013 Kuwahara ............. H04W 48/10
455/561
2013/0274952 A1\* 10/2013 Weslati ............. B60W 50/0097
701/1
(Continued)

FOREIGN PATENT DOCUMENTS

CN 101136811 A 3/2008
CN 101753181 B \* 4/2015

*Primary Examiner* — Syed Haider
(74) *Attorney, Agent, or Firm* — Finnegan, Henderson, Farabow, Garrett & Dunner LLP

(57) ABSTRACT

A modem apparatus is configured to provide wireless network access in accordance with an Orthogonal Frequency Division Multiplexing communications scheme. The apparatus comprises a hardware subsystem comprising baseband processing components (302), Radio Frequency processing components (304) and a digital interface. The Radio Frequency processing components (304) comprise a converter component arranged to convert between time and frequency domains in accordance with the Orthogonal Frequency Division Multiplexing communications scheme; a subcarrier processing component operably coupled to the converter component, the subcarrier processing component being arranged to implement conversion between a collapsed space of subcarriers and an expanded space of subcarriers in accordance with resource assignment data; a cyclic prefix processing component responsive to control information. The baseband processing components (302) comprise a channel estimation component. The digital interface (306) is disposed between the baseband processing components (302) and the RF processing components (304), the digital interface (306) being operably coupled to the subcarrier processing component and the channel estimation component.

20 Claims, 10 Drawing Sheets

(51) Int. Cl.
*H04W 72/04* (2009.01)
*H04W 88/08* (2009.01)
*H04B 1/40* (2015.01)
*H04L 5/00* (2006.01)

(52) U.S. Cl.
CPC ...... *H04L 27/2626* (2013.01); *H04L 27/2647* (2013.01); *H04W 72/042* (2013.01); *H04B 1/40* (2013.01); *H04L 5/0007* (2013.01); *H04W 88/085* (2013.01)

(58) Field of Classification Search
CPC .............. H04L 5/0007; H04W 72/042; H04W 88/085; H04B 1/40
See application file for complete search history.

(56) References Cited

U.S. PATENT DOCUMENTS

| | | |
|---|---|---|
| 2013/0279452 A1 | 10/2013 | Liu |
| 2014/0221038 A1* | 8/2014 | Nakashima ......... H04W 52/242 455/522 |
| 2014/0226736 A1 | 8/2014 | Niu et al. |
| 2015/0117277 A1 | 4/2015 | Liu |

* cited by examiner

MODEM APPARATUS, COMMUNICATIONS SYSTEM AND METHOD OF PROCESSING SUBCARRIERS

FIELD OF THE INVENTION

The present invention relates to a modem apparatus of the type that, for example, comprises baseband processing components and radio frequency processing components configured in accordance with the Orthogonal Frequency Division Multiplexing communications scheme. The present invention also relates to a method of processing subcarriers, the method being of the type that, for example, digitally interfaces between baseband processing components and radio frequency processing components.

BACKGROUND OF THE INVENTION

Communications systems that are reliant upon Orthogonal Frequency Division Multiplexing schemes, for example Long Term Evolution (LTE) communications systems, which are sometimes referred to as 4G communications systems, are known to employ base stations, sometimes referred to as evolved Node Bs (eNode Bs) capable of communicating with User Equipment (UE) units. The UE units are typically used by subscribers to one or more cellular communications services provided by a network infrastructure that comprises a plurality of the eNode Bs to support a respective plurality of notional cells that provide wireless communications coverage for the UEs over a geographic region. The eNode Bs and the UE units are examples of communications equipment that comprise modems. For some applications, it is desirable to implement a modem using a baseband Integrated Circuit (IC) operably coupled to a separate Radio Frequency (RF) IC, because greater design flexibility is achieved.

In the UE unit, the baseband IC and the RF IC together support a transceiver architecture having a transmitter chain and a receiver chain that support operation in accordance with the different variants of the Orthogonal Frequency Division Multiplexing (OFDM) communications scheme used respectively for uplink and downlink communications. Typically, a received signal is down-converted by the RF IC and communicated to the baseband IC centred about a frequency in a range of baseband frequencies. Similarly, digital signals to be transmitted are generated in the baseband IC, centred about a frequency in the range of baseband frequencies, and communicated to the RF IC, where they are modulated onto a carrier signal having a carrier frequency. The signals communicated between the baseband IC and the RF IC are communicated via a digital interface.

However, LTE and, especially the LTE-Advanced variant, employs a number of methods to increase wireless communications data rate and/or reliability, for example Multiple Input Multiple Output (MIMO) and carrier aggregation. Such optimisations result in an increase in the amount of data that the digital interface needs to support being communicated thereacross. Increasing data throughput with respect to the digital interface introduces undesirable consequences, for example, an increase in power consumption attributable to the digital interface and an increase in the complexity of the digital interface, such as by virtue of a requirement to increase the number of physical pins to support data communication between the broadband IC and the RF IC. Indeed, the design of the digital interface has been continually optimised in order to support progressively more stringent bandwidth requirements, energy consumption requirements and attempts to minimise signal interference between ICs. However, as indicated above, certain optimisations are accompanied by an associated technical cost, which sometimes also has negative financial implications.

US patent publication no. 2013/3315288 also strives to reduce the amount of data transmitted over a digital interface. However, the saving in data throughput is achieved by controlling word length of digital samples of a received signal.

BRIEF SUMMARY OF THE INVENTION

According to a first aspect of the present invention, there is provided a modem apparatus configured to provide wireless network access in accordance with an Orthogonal Frequency Division Multiplexing communications scheme, the apparatus comprising: a hardware subsystem configured in accordance with the Orthogonal Frequency Division Multiplexing communications scheme and comprising baseband processing components, Radio Frequency processing components and a digital interface; wherein the Radio Frequency processing components comprise: a converter component arranged to convert between time and frequency domains in accordance with the Orthogonal Frequency Division Multiplexing communications scheme; a subcarrier processing component operably coupled to the converter component, the subcarrier processing component being arranged to implement conversion between a collapsed space of subcarriers and an expanded space of subcarriers in accordance with resource assignment data; a cyclic prefix processing component responsive to control information; the baseband processing components comprise: a channel estimation component; and the digital interface is disposed between the baseband processing components and the RF processing components, the digital interface being operably coupled to the subcarrier processing component and the channel estimation component.

The resource assignment data may be user equipment specific.

The conversion between the collapsed space of subcarriers and the expanded space of subcarriers in accordance with the resource allocation data may be a predetermined tone and subcarrier correspondence assigned in accordance with the Orthogonal Frequency Division Multiplexing communications scheme.

The converter component may be a Fourier computation component. The Fourier computation component may be a Fourier transform component. The Fourier computation component may be an inverse Fourier transform component. The Fourier computation component may be a Fast Fourier transform component. The Fourier computation component may be an inverse Fast Fourier transform component. The Fourier computation component may be a Digital Fourier transform component. The Fourier computation component may be an inverse Digital Fourier transform component.

The baseband processing components may further comprise: a channel equalisation component operably coupled to the channel estimation component; and a Physical Downlink Control Channel decoder component operably coupled to the channel equalisation component.

The apparatus may further comprise a downlink control information decoder and parser arranged to obtain resource assignment data from downlink control information of a Physical Downlink Control Channel.

The resource assignment data may be obtained from a resource allocation field of the downlink control information. The resource assignment data may be obtained from a resource block assignment part of the resource allocation field.

The subcarrier processing component may comprise an allocated resources selector sub-component having a subcarrier input; the allocated resources selector sub-component may be arranged to identify only wanted subcarriers from amongst unwanted subcarriers in response to receipt at the subcarrier input of subcarriers comprising the wanted and unwanted subcarriers, the wanted subcarriers being defined by the resource assignment data.

The downlink control information decoder may be arranged to communicate the resource assignment data to the subcarrier processing component.

The subcarrier processing component may be arranged to identify only wanted subcarriers from amongst unwanted subcarriers.

The allocated resources selector sub-component may be arranged to use the resource assignment data to select the wanted subcarriers from the received subcarriers; the wanted subcarriers may be user equipment specific.

The baseband processing components may comprise the downlink control information decoder and parser and the downlink control information decoder and parser may be arranged to communicate the resource assignment data via a control channel of the digital interface.

The apparatus may further comprise: a protocol software component arranged to identify a subcarrier bearing a reference signal.

The subcarrier identified by the protocol software component may be identified to the subcarrier processing component and the wanted subcarriers includes the subcarrier may be identified by the protocol software component.

The subcarrier processing component may further comprise a demapping sub-component operably coupled to the allocated resources selector sub-component; the demapping sub-component may be arranged to receive the wanted subcarriers from the allocated resources selector sub-component; and the demapping sub-component may be arranged to de-map the wanted subcarriers in accordance with the resource assignment data.

The apparatus may further comprise a buffer operably coupled to an input of the demapping sub-component.

The resource assignment data may be downlink resource allocation data.

The subcarrier processing component may comprise a mapping sub-component; the mapping sub-component may be arranged to receive the resource assignment data; and the mapping sub-component may be arranged to receive symbols via the digital interface and to map the received symbols in accordance with the resource assignment data.

The resource assignment data may be uplink resource allocation data.

The subcarrier processing component may comprise a subcarrier padding sub-component operably coupled to the first converter component; and the subcarrier padding sub-component may be arranged to insert zero padding data in respect of subcarriers unallocated with respect to the resource assignment data.

The hardware subsystem may comprise a transceiver; the transceiver may comprise the Radio Frequency processing components, the baseband processing components, and the digital interface.

The Radio Frequency processing components, the baseband processing components, and the digital interface may be arranged to support a transmitter chain.

The Radio Frequency processing components, the baseband processing components, and the digital interface may be arranged to support a receiver chain.

The hardware sub-system may support Orthogonal Frequency Division Multiplexing according to a Long-Term Evolution wireless communications standard.

According to a second aspect of the present invention, there is provided a communications apparatus comprising the modem apparatus as set forth above in relation to the first aspect of the invention.

According to a third aspect of the present invention, there is provided a user equipment unit comprising the communications apparatus as set forth above in relation to the second aspect of the invention.

According to a fourth aspect of the present invention, there is provided a communication system comprising the modem as set forth above in relation to the first aspect of the invention.

According to a fifth aspect of the present invention, there is provided a method of processing subcarriers in a modem apparatus configured to provide wireless network access in accordance with an Orthogonal Frequency Division Multiplexing communications scheme, the method comprising: Radio Frequency processing components converting between time and frequency domains in accordance with the Orthogonal Frequency Division Multiplexing communications scheme; Radio Frequency processing components converting subcarriers between a collapsed space of subcarriers and an expanded space of subcarriers in accordance with resource assignment data; Radio Frequency processing components processing cycling prefix data; baseband processing components generating a channel estimate; and a digital interface interfacing between the baseband processing components and the Radio Frequency processing components to support communication of data between a node associated with subcarrier processing and a node associated with channel estimation processing.

It is thus possible to provide an apparatus, method and system that reduces the data transfer across the digital interface between the baseband IC and the RF IC. The reduction in data transfer can be between about 34% and about 99%, depending upon the resource allocation configuration for uplink and downlink communications. This, in turn, reduces the power consumption attributable to the digital interface as well as latency across the digital interface. By maintaining separate baseband and RF ICs, it is also possible to support separate product development of baseband and RF ICs and a modular architecture. Additionally, the above approach reduces wafer "real estate" requirements for a wireless transmitter, receiver and/or transceiver.

BRIEF DESCRIPTION OF THE DRAWINGS

At least one embodiment of the invention will now be described, by way of example only, with reference to the accompanying drawings, in which.

DETAILED DESCRIPTION OF THE INVENTION

Figure 1:
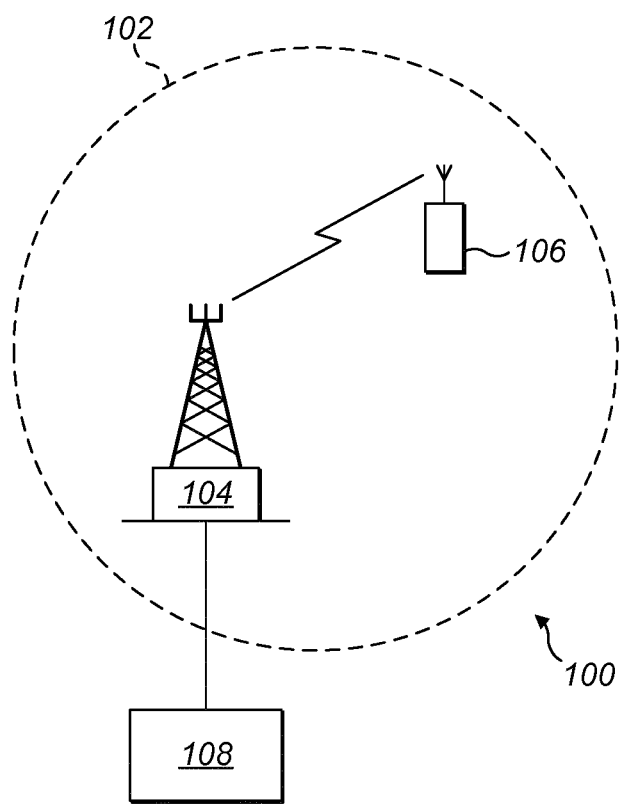
FIG. 1 is a schematic diagram of a user equipment unit operating in a part of a communications network.

Throughout the following description identical reference numerals will be used to identify like parts.

Referring to FIG. 1, in a wireless communications system, for example a Long Term Evolution (LTE) communications system 100, a communications network is supported by a plurality of cells arranged to provide wireless communications access over a geographic region. In this example, only a single cell is shown for the sake of simplicity and conciseness of description. However, the skilled person will appreciate that a greater number of cells is usually deployed throughout the communications network. In this respect, a cell 102 is supported by a base station, referred to as an evolved Node B (eNode B) 104 in the context of the LTE communications system 100. The eNode B 104 is capable of communicating wirelessly with a communications apparatus, for example a User Equipment (UE) unit 106, over an air interface. The eNode B 104 is operably coupled to an Evolved Packet Core (EPC) 108. However, since the examples set forth herein concern the UE unit 106, for the sake of clarity and conciseness of description, further details of the wireless communications network infrastructure will not be described herein. Furthermore, whilst the examples set forth herein are described in the context of the LTE communications system 100, the skilled person will appreciate that the examples are applicable to other kinds of communications networks that operate in accordance with the Orthogonal Frequency Division Multiplexing (OFDM) communications scheme, for example communications networks operating in accordance with the Worldwide Interoperability for Microwave Access (WiMAX) communications standard and the WiFi standard (IEEE 802.11).

Figure 2:
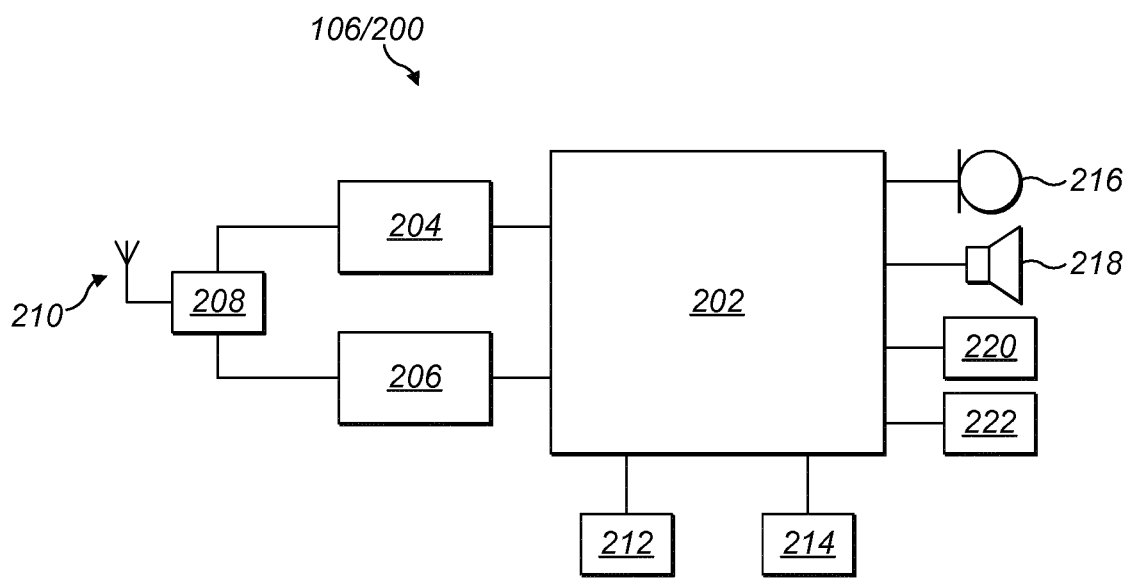
FIG. 2 is a schematic diagram of the user equipment device of FIG. 1 constituting an embodiment of the invention.

Turning to FIG. 2, the user equipment (UE) device 106/200 operating in the LTE communications system, comprises a processing resource 202, the processing resource 202 being, in this example, a chipset of a cellular communications terminal. The processing resource 202 is coupled to a transmitter chain 204 and a receiver chain 206, the transmitter and receiver chains 204, 206 being coupled to a duplexing apparatus 208. The duplexing apparatus 208 is coupled to an antenna 210.

The UE unit 200 also possesses a volatile memory, for example a RAM 212, and a non-volatile memory, for example a ROM 214, each coupled to the processing resource 202. The processing resource 202 is also coupled to a microphone 216, a speaker unit 218, a keypad 220 and a display 222. The skilled person should appreciate that the architecture of the UE unit 200 described above comprises and can comprise other elements, for example multiple antennae, but such additional elements have not been described in detail herein for the sake of preserving conciseness and clarity of description.

The transmitter chain 204 and the receiver chain 206 are supported by a hardware subsystem. The transmitter chain 204 and the receiver chain 206 are part of a transceiver, which is part of a modem of the UE unit 200. The modem is configured to provide wireless network access in accordance with the OFDM communications scheme, for example as defined in the LTE standard. In the examples set forth herein, the term modem should be understood to embrace any suitable signal modulation and/or demodulation apparatus capable of supporting operation in accordance with the OFDM communications scheme. The hardware subsystem is a collection of hardware and/or software elements that contributes, with other subsystems, to the transmitter chain 204 and/or a receiver chain 206.

Figure 3:
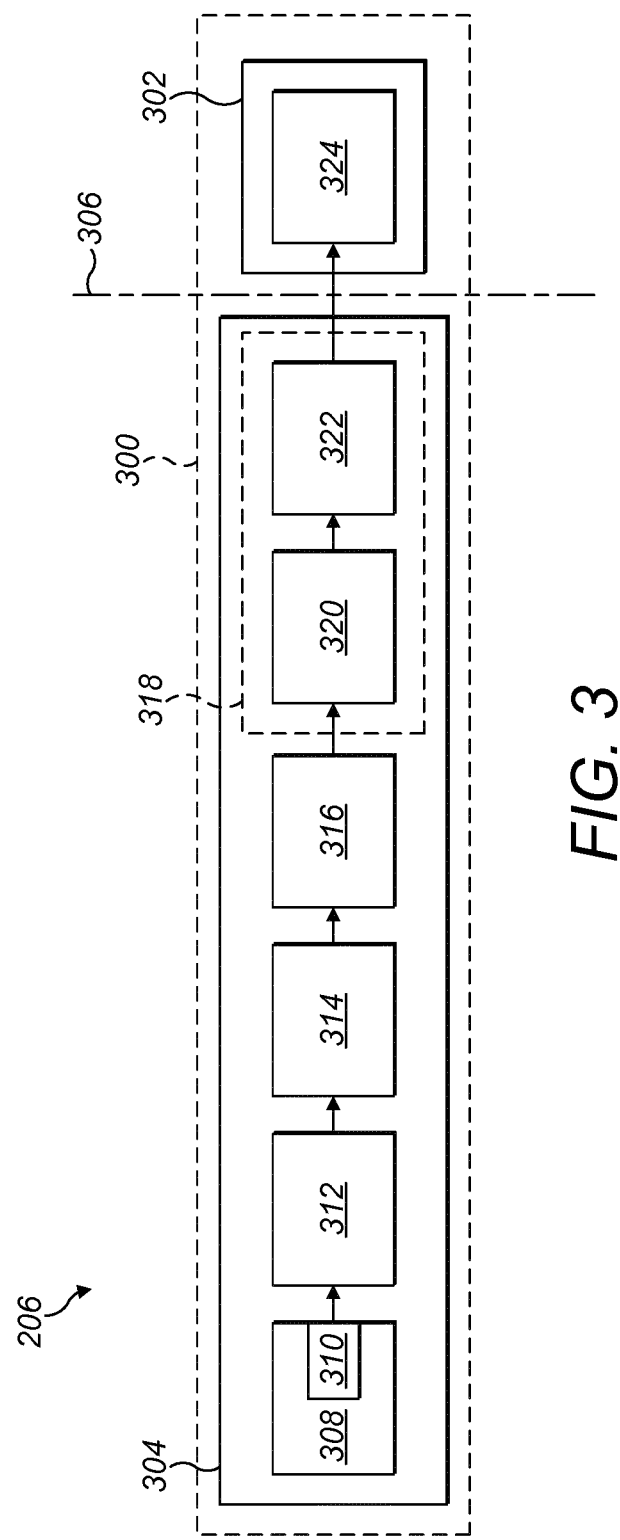
FIG. 3 is a schematic diagram of a receive path of a hardware subassembly of a modem apparatus constituting another embodiment of the invention.

Referring to FIG. 3, the hardware subsystem 300, which is configured in accordance with the OFDM communications scheme, comprises a baseband Integrated Circuit (IC) 302 and a Radio Frequency (RF) IC 304 to support the receiver chain 206. A digital interface 306 is disposed between the baseband IC 302 and the RF IC 304 for communication therebetween. The baseband IC 302 is an example of baseband processing components and the RF IC 304 is an example of RF processing components. These are functional components, arranged in stages. For a receiver chain, these baseband processing components process an incoming OFDM signal after it has been translated from being centred about a carrier frequency to being about a baseband range of frequencies, i.e. to a range of frequencies in which the carrier frequency has been remove. For a transmitter chain, the opposite applies, namely that a signal in the baseband range of frequencies, prior to being translated to the analogue domain and up-converted onto a carrier frequency, is processed by these components. For a receiver chain, the RF processing components are functional components that are arranged in stages to down-convert a received OFDM signal down to the baseband range of frequencies. For a transmitter chain, these are functional components arranged to modulate a received digital signal centred about a baseband range of frequencies onto a carrier signal. The digital interface 306 is an interface between the baseband processing components and the RF processing components, which is subject to minimal specification under the LTE standard and provided to communicate digital data, for example, between the baseband processing components and the RF processing components in support of the OFDM communications scheme. However, in the examples set forth herein, the RF processing components adopt some of the baseband processing tasks that hitherto have been performed by the baseband processing components (in place of their performance by the baseband processing components) in order to reduce data bandwidth usage across the digital interface 306.

The receiver chain 206 is supported by the baseband IC 302, the RF IC 304 and the digital interface 306 in the following manner. The RF IC 304 comprises upstream RF processing, designated by upstream RF processing unit 308, which includes filtering, amplification, frequency conversion and gain control. As these, and other, components of the upstream RF processing unit 308 would be readily understood by the skilled person and have no bearing on the understanding of the inventive concepts expounded in the examples set forth herein, they will not be described in further detail herein. The upstream RF processing unit 308 is operably coupled to an input of a first converter unit, for example an analogue-to-digital converter 310, having an output operably coupled to a cyclic prefix processing unit, for example a cyclic prefix removal unit 312. Although in the examples set forth herein, uplink and downlink processing of the cyclic prefix will be performed by the cyclic prefix processing unit, the skilled person will appreciate that the processing can be performed by separate processing elements.

The RF IC 304 further comprises a second converter of a different nature to the first converter mentioned above, and is arranged to support conversion between parallel and serial data formats, for example a serial-to-parallel converter unit 314, having an input operably coupled to an output of the cyclic prefix removal unit 312 and an output that is operably coupled to an input of a third converter arranged to support conversion of signals between time and frequency domains in accordance with the OFDM communications scheme, for example an input of a Fast Fourier Transform (FFT) unit 316. An output of the FFT unit 316 is operably coupled to a subcarrier processing component 318 comprising, for example, a subcarrier extraction unit 320 and a subcarrier demapping unit 322. In this example, the output of the FFT unit 316 is operably coupled to an input of the subcarrier extraction unit 320. An output of the subcarrier extraction unit 320 is operably coupled to an input of the subcarrier demapping unit 322. The baseband IC 302 comprises a remainder of the receiver chain 324 having an input thereof that is capable of communicating with an output of the subcarrier demapping unit 322 via the digital interface 306. The remainder of the receiver chain 324 is configured in accordance with the LTE standard, some of which will be described in greater detail later herein. In relation to the subcarrier extraction unit 320 and the subcarrier demapping unit 322, the skilled person will appreciate that, in accordance with 3GPP LT 36.211, 6.3 of the LTE standard, the functionality of these units can be performed by a resource element demapper unit (not shown), but adapted to support the functionality described herein.

The digital interface 306 is located between the subcarrier demapping unit 322 and the remainder of the receiver chain 324, and hence between the RF IC 304 and the baseband IC 302. Furthermore, the subcarrier demapping unit 322 is disposed between the digital interface 306 and the subcarrier extraction unit 320.

Figure 4:
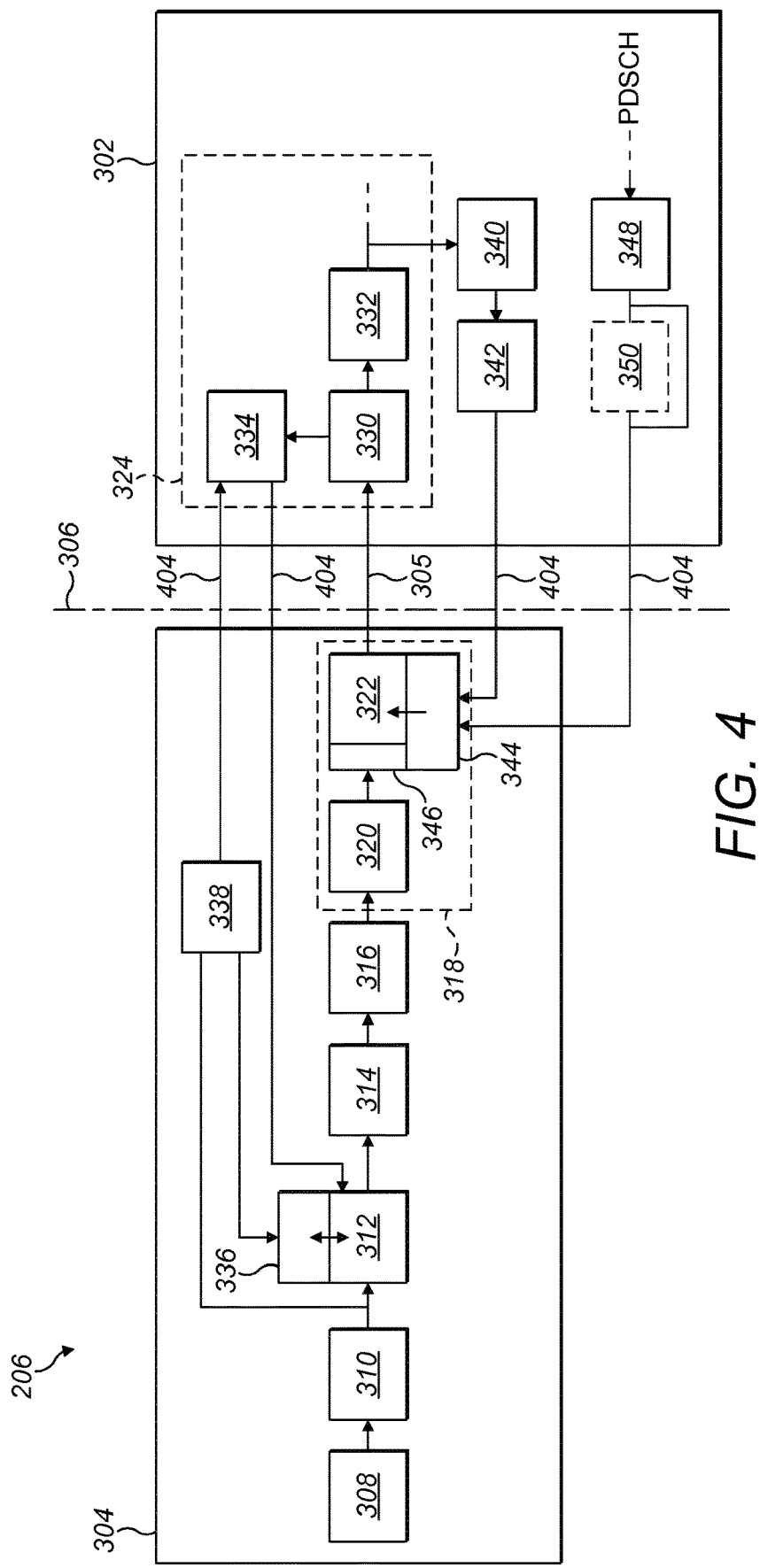
FIG. 4 is a schematic diagram of the subassembly of FIG. 3 in greater detail.

Turning to FIG. 4, the remainder of the receiver chain 324 comprises a channel estimation unit 330 having an input capable of receiving subcarriers communicated from an output of the subcarrier demapping unit 322 via a data channel 305 of the digital interface 306. A first output of the channel estimation unit 330 is operably coupled to a first input of a timing error tracking unit 334. The timing error tracking unit 334 is capable of communicating with the cyclic prefix processing unit, which in this example is the cyclic prefix removal unit 312, via the uplink/downlink control data interface 404 of the digital interface 306. The RF IC 304 comprises a downlink cyclic prefix register 336, which the cyclic prefix removal unit 312 is able to access. The RF IC 304 also comprises a cell search module 338 capable of communicating with the timing error tracking unit 334 via the uplink/downlink control data interface 404 of the digital interface 306. Additionally, the cell search module 338 is operably coupled to the input of the cyclic prefix removal unit 312 and is also capable of writing to the downlink cyclic prefix register 336. The downlink cyclic prefix register 336 also stores the size of the FFT unit 316.

A second output of the channel estimation unit 330 is operably coupled to an input of a channel equalisation unit 332, an output of which is operably coupled to other functional components of the receiver chain 206, which includes components to perform demodulation, serial-to-parallel conversion, de-rate matching and channel decoding. As these, and other, components of the remainder of the receiver chain 206 would be readily understood by the skilled person and have no bearing on the understanding of the inventive concepts expounded in the examples set forth herein, they will not be described in further detail herein.

The baseband IC 302 also comprises a Physical Downlink Control CHannel (PDCCH) decoder component 340 having an input operably coupled to an output of the channel equalisation unit 332 and is hence capable of receiving data transmitted on the PDCCH. An output of the PDCCH decoder component 340 is operably coupled to an input of a Downlink Control Information (DCI) decoder 342. An output of the DCI decoder 342 is operably coupled to, and is capable of writing to, a resource assignment data store, for example a resource assignment store 344, via the uplink/downlink control data interface 404 of the digital interface 306; the subcarrier demapping unit 322 is capable of accessing the resource assignment store 344. The resource assignment store 344 is provided in order to store uplink resource allocation data and downlink resource allocation data. The subcarrier processing component 318 also comprises an allocated resources selector sub-component 346 and so an input of the allocated resource selector sub-component 346 is operably coupled to the output of the subcarrier extraction unit 320. The subcarrier demapping unit 322 can comprise the allocated resources selector sub-component 346. The hardware subsystem 300, and in this example specifically the baseband IC 302, comprises a protocol software component 348. The protocol software component 348 is capable of receiving data communicated on the Physical Downlink Shared CHannel (PDSCH). An output of the protocol software component 348 is operably coupled to the resource allocation store 344 via the uplink/downlink control data interface 404 of the digital interface 306. In another embodiment, the baseband IC 302 can comprise reference signals identification logic 350 having an input operably coupled to the output of the protocol software component 348. An output of the reference signal identification logic 350 is operably coupled to the resource allocation store 344.

Figure 5:
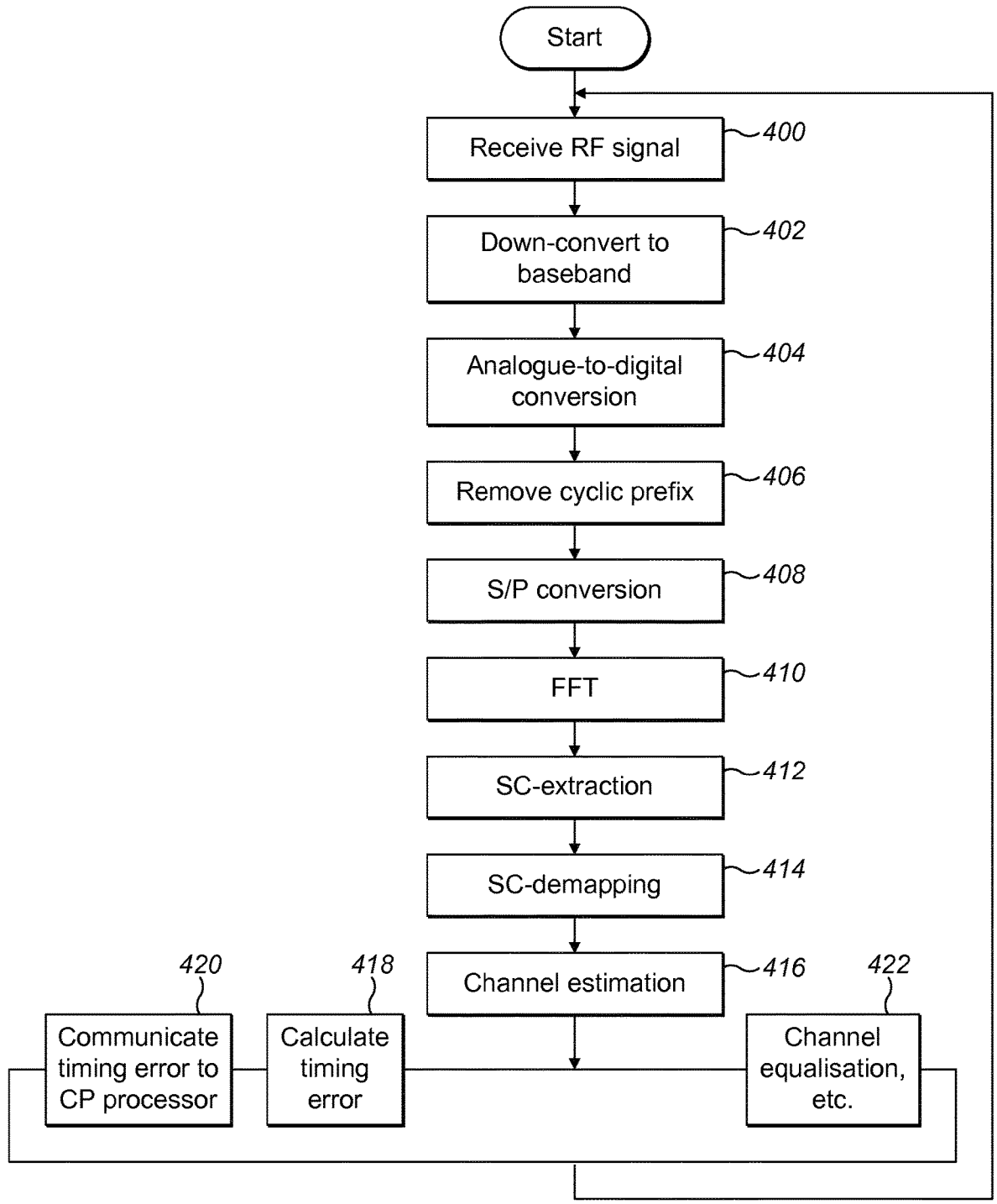
FIG. 5 is a flow diagram of a part of a method of processing subcarriers employed by the modem apparatus of FIGS. 3 and 4 and constituting a further embodiment of the invention.

In operation (FIGS. 5 and 6), an RF signal, received (Step 400) through the antenna 210 of the UE unit 200 and the duplexer 208, is down-converted (Step 402) by the upstream RF processing unit 308 of the RF IC 304 to an analogue baseband signal and the analogue baseband signal is communicated to the analogue-to-digital converter 310 in order to convert (Step 404) the analogue baseband signal to the digital domain. The analogue-to-digital converter 310 therefore generates a digital signal in response to the analogue baseband signal received, the digital signal constituting a train of symbols arranged in accordance with a frame structure as specified in the LTE standard, each frame comprising a plurality of symbols. According to the LTE standard, the symbols are each prefixed with a cyclic prefix, which serves as a guard interval and to reduce the effects of inter-symbol interference. As part of processing of the digital signal, according to the LTE standard, the cyclic prefixes require removal (Step 406).

In this respect, the cyclic prefix removal unit 312 accesses the downlink cyclic prefix register 336 in order to determine the length of the downlink cyclic prefix. However, the downlink cyclic prefix register 336 needs, inter alia, to contain the length of the downlink cyclic prefix for use in removing the cyclic prefix. In this respect, the cell search module 338 receives downlink data communicated between the analogue-to-digital converter 310 and the cyclic prefix removal unit 312. The cell search module 338 initiates a cell search procedure in accordance with the LTE standard. Particular to this downlink aspect of the embodiment, the cell search module 338 uses downlink synchronisation channels in order to find a primary synchronisation signal and then a secondary synchronisation signal within the primary synchronisation signal in order to detect the length of the downlink cyclic prefix being used. Once detected, the length of the downlink cyclic prefix is written by the cell search module 338 to the downlink cyclic prefix register 336.

The cyclic prefix removal unit 312 also receives control data, comprising sample position number data, constituting timing data, from the timing error tracking unit 334. The cyclic prefix removal unit 312 uses this timing data in order to locate accurately, in terms of a sample position number, such as an $n^{th}$ sample, the optimal position of the start of signal energy with respect to the cyclic prefix in the presence of inter-symbol interference from a preceding symbol. In this regard, this sample position number data, the stored size of the FFT unit 316, and the accessed length of the downlink cyclic prefix can be used with any suitable cyclic prefix removal algorithm used in baseband ICs to serve as the cyclic prefix removal unit 312, but located in the RF IC 304 in this example. The cyclic prefix removal unit 312 thus uses the sample position number data, the FFT size data and the length of the downlink cyclic prefix to remove (Step 406) the cyclic prefix, for example to omit purposely to communicate the cyclic prefix to the serial-to-parallel converter unit 314. With the cyclic prefix removed, the unprefixed symbols are communicated as a serial data stream to the serial-to-parallel converter 314, where the symbols are converted (Step 408) to parallel data before being communicated to the FFT unit 316. The FFT unit 316 then applies a Fast Fourier Transform algorithm (Step 410) to the symbol bearing signal, which is in the time domain, to convert the time domain signal to the frequency domain, i.e. to yield a frequency signal. The output of the FFT unit 316 is then communicated to the subcarrier extraction unit 320 of the subcarrier processing component 318 in order to remove (Step 412) unused guard carriers in accordance with the LTE standard. In practice, the FFT unit 316 provides used subcarriers at known outputs thereof in accordance with the LTE standard, the used subcarriers being disposed between unused guard carriers. The location of the known outputs is obtained by decoding of the PDCCH; the outputs can include outputs bearing reference signals. Consequently, the removal of the unused guard bands is achieved simply by reading out the used subcarriers from the known outputs of the FFT unit 316 by the subcarrier demapping unit 322. Thereafter, the used subcarriers read by the subcarrier demapping unit 322 are used by the subcarrier demapping unit 322 to perform subcarrier demapping (Step 414) in order to extract subcarrier resource elements that are allocated to the UE unit 200 in accordance with the resource assignment data.

At this initial stage, where the baseband IC 302 has not yet received the signal comprising the PDCCH and hence resource allocation information, the UE unit 200 is clearly unable to decode the PDCCH and so the subcarrier demapping unit 322 does not have access to resource allocation data and thus has to communicate all received subcarriers, without demapping them, to the remainder of the receiver chain 324. However, as will become apparent from further explanation later herein, once the subcarrier demapping unit 322 has access to downlink resource allocation data, the subcarrier demapping unit 322 is able to demap (Step 414) the subcarriers in order to extract the subcarrier resource elements that the UE unit 200 needs to decode.

After subcarrier extraction, the demapped signal comprising only the allocated subcarriers can be passed to the remainder of the receiver chain 324, where the channel is estimated (Step 416) and the timing error tracking unit 334 determines (Step 418) any error in identification of the start of the signal energy of the symbol. This error can be calculated in a number of ways. For example, a coarse estimate of the start of the symbol is generated and communicated by the cell search module 338 to the timing error tracking unit 334. The initial estimate is then communicated by the timing error tracking unit 334 to the cyclic prefix removal unit 312 in terms of a sample position number. The accuracy of the initial estimate can then be improved upon using any suitable known technique. For example, the timing error tracking unit 334 can use a reference signal obtained directly from the output of the subcarrier demapping unit 322, the reference signal resulting from use of the initial estimated sample position number. Alternatively, and as employed in this example, the accuracy of the initial estimate can be improved by the timing error tracking unit 334 obtaining the reference signal from the subcarrier demapping unit 322 but via the channel estimation unit 330, as well as channel delay profile data generated by the channel estimation unit 330. The timing error tracking unit 334 then determines a revised sample position number. Once calculated, the sample position number data is communicated (Step 420) to the cyclic prefix processing unit 312 as control information for use and storage in the downlink cyclic prefix register 336. In this example, the timing error tracking unit 334 communicates the sample position number data to the cyclic prefix processing unit at a rate of at least once per subframe of the LTE system. In this example, the sample position number is also communicated in synchronism with a subframe boundary, i.e. in synchronism with the boundary between subframes.

The output of the channel estimation unit 330 is also subjected to channel equalisation (Step 422) by the channel equalisation unit 332 prior to any further processing of the received signal by the remainder of the receiver chain 324. The above process (Steps 400 to 422) is repeated whilst the RF signal is being received in order to continually process the received RF signal.

Figure 6:
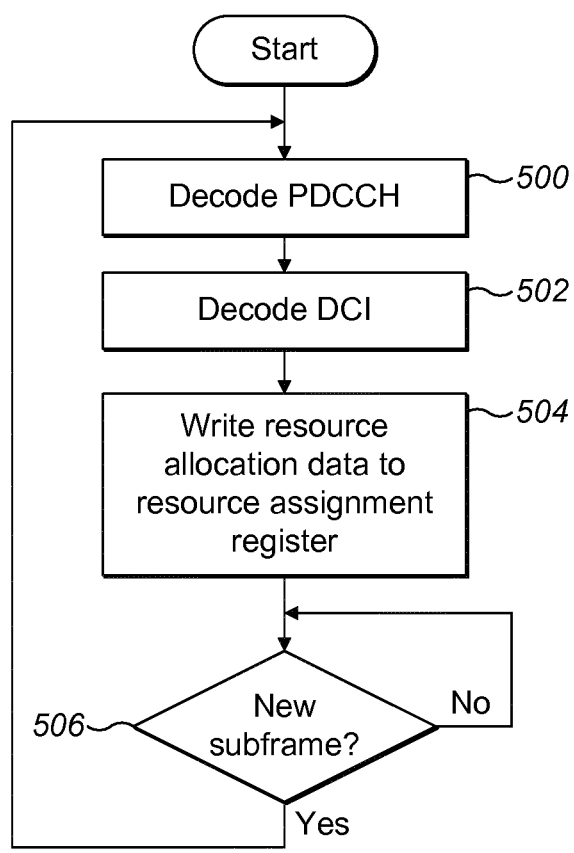
FIG. 6 is a flow diagram of another part of the method of processing subcarriers employed by the modem apparatus of FIG. 4.

Referring to FIG. 6, once channel equalisation has been performed, the PDCCH is accessible by the baseband IC 302 and so can be decoded (Step 500). Thereafter, the DCI decoder 342 is able to decode (Step 502) the downlink control information present in the PDCCH. In addition to decoding the downlink control information, the DCI decoder 342 also parses the downlink control information to extract the resource assignment data from a resource allocation field of the downlink control information, in particular a resource block assignment part of the resource allocation field. In this respect, the resource assignment data identifies allocation of resources for uplink and downlink communications, the data conforming to a predetermined data structure definition according to the LTE standard. In this respect, in accordance with the LTE standard, the downlink resource allocation data is relevant to a current subframe, whereas uplink resource allocation data relates to a predetermined number of subframes in advance of the current subframe, for example four subframes in advance.

In this example, the DCI decoder 342 therefore writes (Step 504) the uplink and downlink resource allocation data, each constituting resource assignment data, to the resource assignment store 344 for use by a subcarrier mapping unit (not shown) in respect of uplink communications and the allocated resources selector sub-component 346/the subcarrier demapping unit 322 in order to implement a resource selection operation for downlink communications, details of which will be described later herein. In relation to the uplink resource allocation data, the uplink resource allocation data is enriched by the DCI decoder 342 with an identifier, for example an offset value, such as an offset value of four, which identifies the subframe to which the uplink resource allocation data relates. The DCI decoder 342 then awaits (Step 506) a subsequent subframe in order to decode subsequent downlink control information.

Once resource assignment data begins to be received, the allocated resources selector sub-component 346/the subcarrier demapping unit 322 can then perform the resource selection operation in order to select wanted carriers that are intended for the UE unit 200, thereby excluding unwanted subcarriers that are not intended for the UE unit 200. In this respect, the allocated resources selector sub-component 346 of the subcarrier processing component 318 accesses the resource assignment store 344 in order to obtain the resource allocation data written thereto in order to apply the downlink resource allocation data in order to discriminate between wanted and unwanted subcarriers. In this respect, following extraction of zeros used to occupy unused subcarriers using any appropriate technique, for example using the subcarrier extraction unit 320, the subcarrier processing component 318 further processes the extracted subcarriers, which require demapping and "thinning" to remove unwanted subcarriers that are not relevant to the UE unit 200. The subcarriers received by the subcarrier extraction unit 320 therefore comprise wanted and unwanted subcarriers. The wanted subcarriers are defined by the resource assignment data decoded by the DCI decoder 342, which identifies the resources allocated to the UE unit 200, i.e. the resource assignment data is specific to the UE unit 200. Indeed, as will be appreciated by the skilled person, the downlink control information is scrambled with an identity of the UE unit 200 and so the DCI decoder 342 only decodes the downlink control information intended for the UE unit 200 and thus the resource assignment data identifying the resource elements assigned to the UE unit 200 by the eNode B 104.

Consequently, using the downlink resource allocation data, which identifies the resource elements assigned to and/or required by the UE unit 200, the allocated resources selector sub-component 346 obtains the wanted subcarriers from amongst the unwanted subcarriers and communicates the wanted subcarriers to the sub-components of the sub-carrier demapping unit 322 responsible for implementing demapping of subcarriers. In this respect, the allocated resources selector sub-component 346 implements the resource selection operation on the received subcarriers using the downlink resource allocation data. Using the downlink resource allocation data stored by the resource assignment store 344, the subcarrier demapping unit 322 then de-maps the wanted subcarriers intended for the UE unit 200 to a set of M equally-spaced adjacent subcarriers of amplitude and phase corresponding to a QAM waveform generated by the eNode B 104. In this respect, an expanded space of N equally-spaced adjacent subcarriers is defined that spans the bandwidth of the LTE communications system 100 in accordance with the LTE standard. The set of M equally-spaced adjacent subcarriers constitutes a collapsed space of M equally-spaced subcarriers that is less than or equal to the space of N equally-spaced subcarriers. Hence, as can be seen, the subcarrier processing component 318 is arranged to convert between the expanded space of subcarriers and the collapsed space of subcarriers. Moreover, in this example, the conversion between the collapsed space of subcarriers and the expanded space of subcarriers in accordance with the resource allocation data is a predetermined tone and subcarrier correspondence assigned in accordance with the Orthogonal Frequency Division Multiplexing communications scheme.

The set of M equally-spaced subcarriers are then communicated to the channel estimator 330 of the baseband IC 302 via the data channel 305 of the digital interface 306 for further processing by the baseband IC 302.

In addition to subcarriers allocated to the UE unit 200, the downlink signal comprises subcarriers bearing reference signals, some of which are cell-specific, which are used by the UE unit 200 for various functionality, for example to perform downlink channel estimation and positioning. The mapping of the reference signals to subcarriers is specified in 3GPP TS 36.211 6.10 of the LTE standard. In this example, the reference signals are needed by the baseband IC 302 and so the subcarriers bearing the reference signals need to be communicated to the baseband IC 302 by the RF IC 304 irrespective of, and in addition to, the subcarriers allocated to the UE unit 200.

In order to select the subcarriers bearing the reference signals, it is necessary to determine further specific information concerning configuration of the mapping of the reference signals, because the distribution of the reference signals within the N subcarriers of the downlink bandwidth of the communications system 100 varies depending various parameters, for example reference signal type, cell identity, and/or transmit antenna. Meta data can be extracted by the protocol software component 348 during, for example a cell selection procedure and/or when an eNode B update takes place once the UE unit 200 is in a connected mode.

In this respect, the protocol software component 348 receives the data communicated on the PDSCH and generates configuration data identifying the respective subcarriers bearing the reference signals in the downlink bandwidth. The protocol software component 348 then communicates the generated configuration data to the RF IC 304 via the uplink/downlink control data interface 404 of the digital interface 306, and the received configuration data is stored in the resource assignment store 344 of the subcarrier processing component 318 for subsequent use by the allocated resource selector sub-component 346.

In this respect, the allocated resources selector sub-component 346 of the subcarrier processing component 318 accesses the resource assignment store 344 in order to obtain the configuration data written thereto in order to generate further resource allocation data in order to discriminate between subcarriers bearing reference signals and subcarriers that are not bearing reference signals. The further resource allocation data is, in this example, combined with the resource allocation data already stored in respect of the wanted and unwanted subcarriers in order to be able to include in the category of wanted subcarriers, the subcarriers bearing the reference signals. Such a combination can be achieved, for example, using a simple XOR logical function. When the resource allocation data relating to subcarriers allocated to the UE unit 200 is augmented to include subcarriers bearing reference signals, the above described implementation of the resource selection operation by the allocated resource selector sub-component 346 not only selects subcarriers intended for receipt by the UE unit 200, but also the subcarriers bearing the reference signals that are required for additional baseband processing, for example channel equalisation, and the subcarrier demapping unit 322 then de-maps the subcarriers selected by the allocated resource selector sub-component 346, which includes the subcarriers intended for the UE unit 200.

The configuration data is typically updated on a per subframe basis. However, it should be appreciated that it can be possible to generate the configuration data even when the data on the PDSCH is not available to the protocol software component 348 in respect of a given subframe. For example, if the UE unit 200 is known to be stationary or very slow moving, the location of the reference signals is unlikely to change, because the UE unit 200 remains camped on the eNode B. Additionally, in the event that the UE unit 200 is stationary or very slow moving, it can be assumed that channel characteristics are unlikely to fluctuate significantly and so use of updated reference signal data for channel estimation purposes can be suspended for a predetermined number of subframes, for example 3 or 4 subframes.

As mentioned above, in another embodiment, where the baseband IC 302 comprises the reference signal identification logic 350, a bitmap identifying subcarriers bearing reference signals can be generated in the baseband IC 302 and communicated across the digital interface 306 to the subcarrier processing component 318. However, such an approach uses more bandwidth of the digital interface 306 than an approach that communicates the configuration data to the subcarrier processing component 318.

Figure 7:
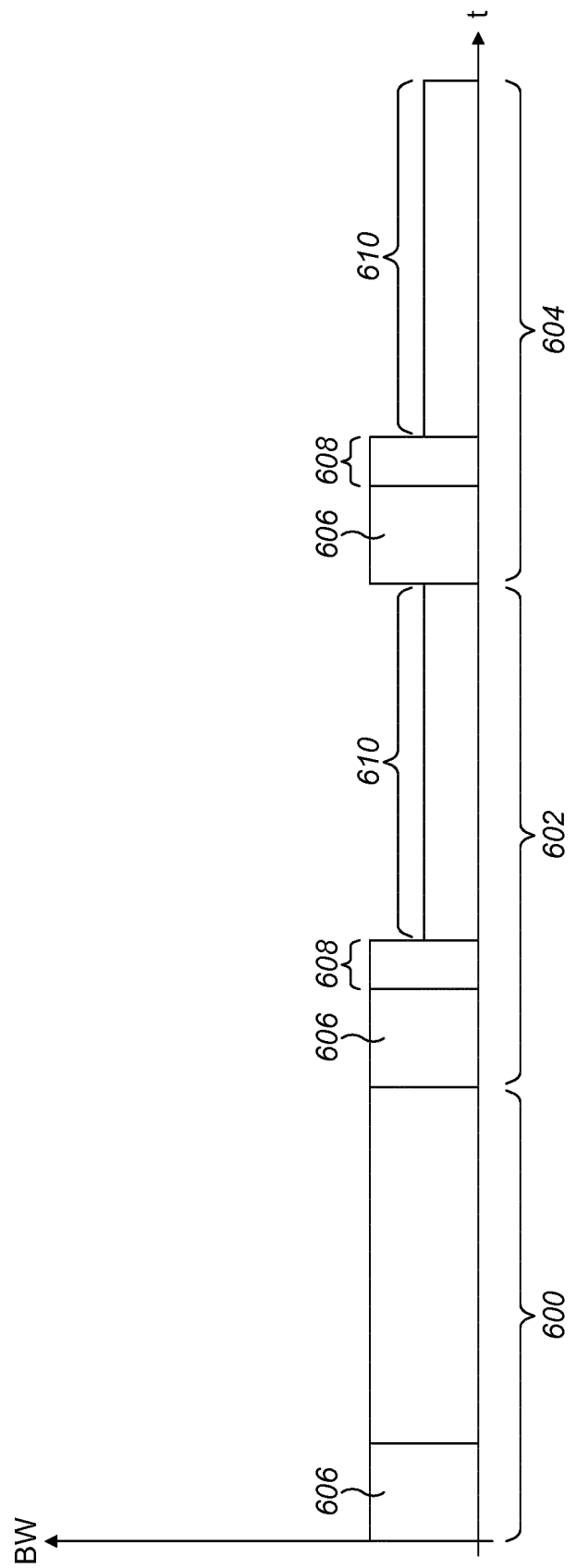
FIG. 7 is a graph of bandwidth usage vs time in respect of downlink communications and the modem apparatus of FIGS. 3 and 4.

Referring to FIG. 7, a first subframe 600, a second subframe 602 and a third subframe 604 are shown. The first subframe 600 is shown for comparison purposes and the second and third subframes 602, 604 should be considered sequential for the purposes of this explanation as they relate to performance of subcarrier processing in accordance with the examples set forth herein relating to downlink communications across the digital interface 306. Referring to the second subframe 602, initially, the digital interface 306 has to be used to communicate all received subcarriers to the baseband IC 302 in order to make the PDCCH and the PDSCH available for decoding and hence to make the downlink resource allocation data available to the subcarrier processing component 318. Hence, while the UE unit 200 is trying to receive control information during an initial time period 606, all received subcarriers without the unused guard subcarriers are communicated across the data channel 305 of the digital interface 306 and no bandwidth reduction is achieved beyond that achieved by removal of the unused guard subcarriers. The absence of such a reduction in bandwidth usage of the digital interface 306 continues for a further period 608 while the control data is being decoded and the subcarrier processing component 318 is being provided with the downlink resource allocation data. Thereafter, the subcarrier processing component 318 is able to implement the thinning of the subcarriers and to demap only wanted subcarriers, which are subsequently communicated across the data channel 305 of the digital interface 306. As can be seen from FIG. 7, less digital interface bandwidth is required during a subsequent period 610 when only the wanted subcarriers need to be communicated across the data channel 305 of the digital interface 306 as opposed to all N subcarriers of the downlink bandwidth. By way of comparison, the first subframe 600 represents bandwidth usage in respect of a digital interface for a receiver chain that employs subcarrier processing in a baseband IC as opposed to an RF IC, i.e. the selection of the wanted subcarriers and the demapping is performed in the baseband IC. As can be seen, the bandwidth usage of the first subframe 600 is greater than that of the second and third subframes 602, 604.

The bandwidth reduction is further exemplified by Table I below, which compares data transfer rates where subcarrier processing is performed by the baseband IC 302 with data transfer rates where subcarrier processing is performed on the other side of the digital interface 306 in the RF IC 304. The calculated bandwidth saving is also provided.

TABLE I

| | | One OFDM Symbol | | | | RFIC to BB IC Transfer rate/ subframe(ms) | | | | IQ Interface BW Savings (%) | |
|---|---|---|---|---|---|---|---|---|---|---|---|
| A | B | C | D | E | F | G | H | I | J | K | L |
| Max Allocation (All Subcarriers allocated to the UE) | | | | | | | | | | | |
| 20 | 30.72 | 2048 | 1200 | 848 | 14 | 30720 | 16800 | | | 45.31% | 45.31% |
| 15 | 23.04 | 1536 | 900 | 636 | 14 | 23040 | 12600 | | | 45.31% | 45.31% |
| 10 | 15.36 | 1024 | 600 | 424 | 14 | 15360 | 8400 | | | 45.31% | 45.31% |
| 5 | 7.68 | 512 | 300 | 212 | 14 | 7680 | 4200 | | | 45.31% | 45.31% |
| 3 | 3.84 | 256 | 180 | 76 | 14 | 3840 | 2520 | | | 34.38% | 34.38% |
| 1.4 | 1.92 | 128 | 72 | 56 | 14 | 1920 | 1008 | | | 47.50% | 47.50% |
| Min Allocation (only 12 Subcarriers allocated to the UE) | | | | | | | | | | | |
| 20 | 30.72 | 2048 | 12 | 2036 | 14 | 30720 | 168 | 2376 | 2544 | 99.45% | 91.72% |
| 15 | 23.04 | 1536 | 12 | 1524 | 14 | 23040 | 168 | 1776 | 1944 | 99.27% | 91.56% |
| 10 | 15.36 | 1024 | 12 | 1012 | 14 | 15360 | 168 | 1176 | 1344 | 98.91% | 91.25% |
| 5 | 7.68 | 512 | 12 | 500 | 14 | 7680 | 168 | 576 | 744 | 97.81% | 90.31% |
| 3 | 3.84 | 256 | 12 | 244 | 14 | 3840 | 168 | 336 | 504 | 95.63% | 86.88% |
| 1.4 | 1.92 | 128 | 12 | 116 | 14 | 1920 | 168 | 120 | 288 | 91.25% | 85.00% |

A - BW (MHz);
B - Sampling frequency (MHz);
C - FFT Size;
D - Number of allocated subcarriers
E - Number of guard subcarriers;
F - Number of symbols per subframe
G - Standard LTE rate – IQ Samples per subframe;
H - Reduced rate – SCs per subframe
I - Additional reference signals;
J - Additional reference signals + allocated subcarriers
K - Only allocated resource blocks reference signals;
L - All cell reference signals sent By way of a further improvement, in another example, a buffer can be disposed between the subcarrier extraction unit 320 and the subcarrier demapping unit 322 in order to buffer subcarriers prior to demapping in order to allow time for the downlink resource allocation data to be obtained and written to the resource assignment store 344, thereby allowing the subcarriers in respect of the further period 608 to be demapped and hence to provide a further reduction in bandwidth usage across the digital interface 306. In such an implementation, the protocol software component 348 is arranged to provide the buffer with an indication of the number of symbols that need to be communicated to the baseband IC 302 in order to decode the downlink control information, the buffer being arranged to store subsequent symbols until the downlink resource allocation data has been obtained by the resource processing component 318. Thereafter, the buffered data is communicated across the data channel 305 of the digital interface after demapping. However, it should be appreciated by the skilled person that such an implementation would require augmentation of the data rate across the digital interface 306 where, for example, the UE unit 200 is allocated all available subcarriers in the expanded space of N subcarriers and so, when averaged, bandwidth savings gained may be eroded. However, the skilled person should appreciate that in practice, all subcarriers of the downlink bandwidth would rarely be allocated to a single UE unit.

Figure 8:
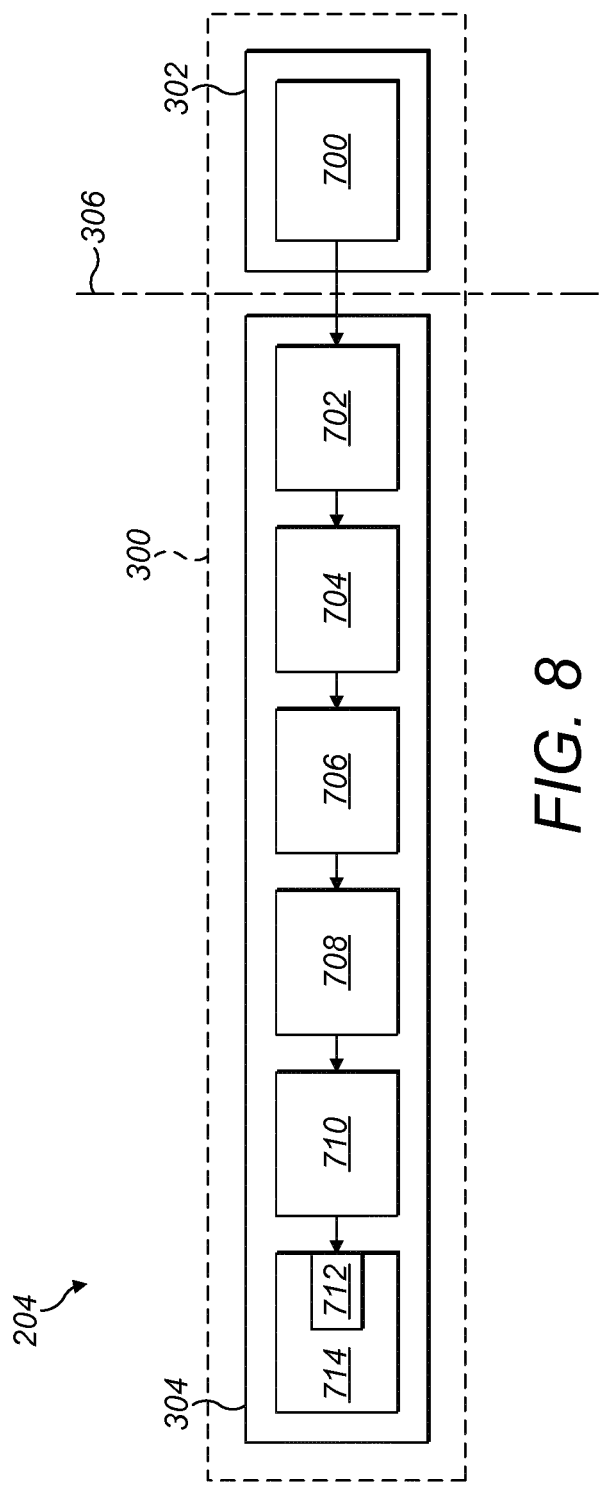
FIG. 8 is a schematic diagram of a transmit path of a hardware subassembly of a modem apparatus constituting another embodiment of the invention.

Referring to FIG. 8, the transmitter chain 204 for a Single-Carrier Frequency Division Multiple Access waveform specified for the LTE communications system is also supported by the baseband IC 302, the RF IC 304 and the digital interface 306 in the following manner. The baseband IC 302 comprises "upstream" baseband processing, designated by upstream baseband processing unit 700, which includes components for, inter alia, Cyclic Redundancy Check (CRC) coding, channel coding, rate matching, serial-to-parallel conversion, modulation and performance of Digital Fourier Transforms (DFTs). As these, and other, components of the remainder of the transmitter chain 204 are set out in the LTE standard and would, in any event, be readily understood by the skilled person and have no bearing on the understanding of the inventive concepts expounded in the examples set forth herein, they will not be described in further detail herein. However, for the sake of completion, these elements have just been mentioned in relation to FIG. 8.

In this example, subcarrier processing is provided in the RF IC 304 instead of the baseband IC 302. As such, the RF IC 304 comprises the subcarrier mapping unit 702 and an output of the upstream baseband processing unit 700 is operably coupled to an input of the subcarrier mapping unit 702. In the RF IC 304, an output of the subcarrier mapping unit 702 is operably coupled to an input of an unused subcarrier zero padding unit 704. In this example, the subcarrier mapping unit 702 and the unused subcarrier zero padding unit 704 constitute a subcarrier processing component 318. The unused subcarrier zero padding unit 704 has an output operably coupled to another example of the third converter arranged to support conversion of signals between the time and frequency domains in accordance with the SC-FDMA communications scheme, for example an input of an N-point Inverse Fast Fourier Transform (IFFT) unit 706. Outputs of the IFFT unit 706 are respectively operably coupled to another example of the second converter, of a different nature to the third converter mentioned above, and arranged to support signal conversion between parallel and serial data formats. For example, the IFFT unit 706 is operably coupled to multiple inputs of a parallel-to-serial converter 708. In relation to the subcarrier mapping unit 702 and the subcarrier zero padding unit 704, the skilled person will appreciate that in accordance with 3GPP LT 36.211, 5.3 of the LTE standard, the functionality of these units can be performed by a resource element mapper unit (not shown), but adapted to support the functionality described herein.

The RF IC 304 also comprises a cyclic prefix processing unit, for example a cyclic prefix addition unit 710 having an input operably coupled to a serial output of the parallel-to-serial converter 708, and comprising a prefix data store or another buffer (not shown). The buffer is operably coupled to the data channel (connection not shown) of the digital interface 306 and the size of the buffer is sufficient to store a maximum possible length of cyclic prefix supported by the OFDM communication scheme. An output of the cyclic prefix addition unit 710 is operably coupled to an input of another example of the first converter unit, for example a digital-to-analogue converter unit 712, having an output operably coupled to a remainder of RF processing circuitry 714 of the RF IC 304, which includes up-conversion components and associated amplification components. As these, and other, components of the remainder of the RF processing circuitry 714 would be readily understood by the skilled person and have no bearing on the understanding of the examples set forth herein, they will not be described in further detail herein.

The output of the upstream baseband processing unit 700 of the baseband IC 302 is capable of communicating data to the subcarrier mapping unit 702 of the RF IC unit 304 via the digital interface 306, the subcarrier mapping unit 702 being disposed between the digital interface 306 and the subcarrier zero padding unit 704.

Figure 9:
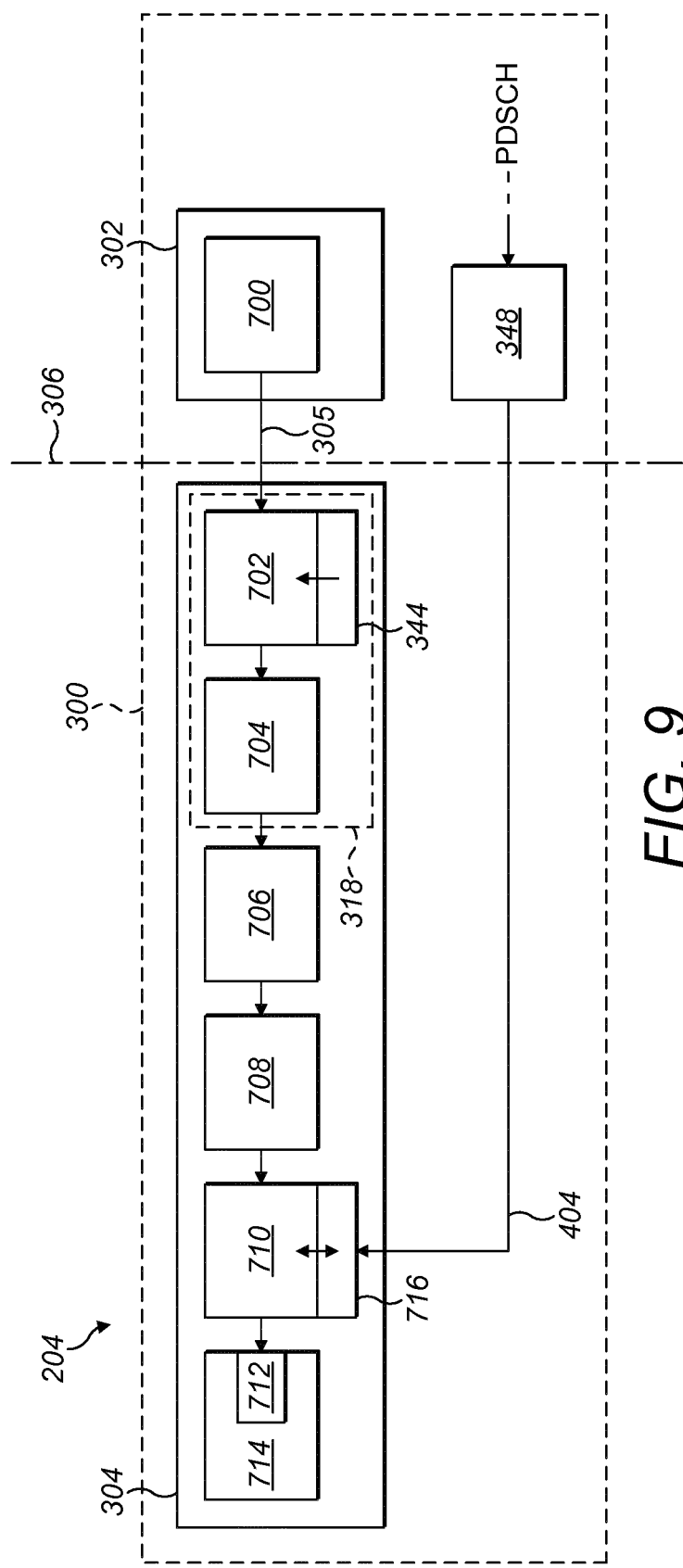
FIG. 9 is a schematic diagram of the subassembly of FIG. 8 in greater detail.

Turning to FIG. 9, the RF IC 304 also comprises an uplink cyclic prefix register 716 for storing the length of the cyclic prefix used by the UE unit 200 for uplink communications. The cyclic prefix addition unit 710 is capable of accessing the uplink cyclic prefix register 716 when necessary. As mentioned above, the hardware subsystem 300 comprises the protocol software component 348, which is also capable of writing to the uplink cyclic prefix register 716 via the uplink/downlink control data interface 404 of the digital interface 306.

Figure 10:
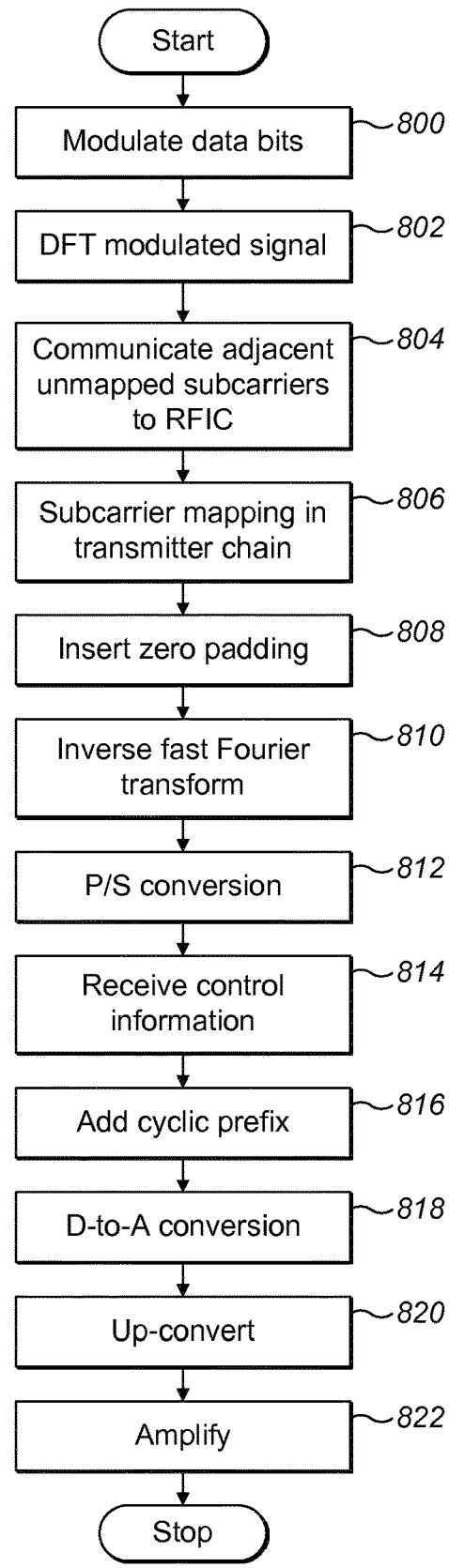
FIG. 10 is a flow diagram of a part of a method of processing subcarriers employed by the modem apparatus of FIGS. 8 and 9 and constituting yet another embodiment of the invention.

As mentioned above in relation to the receiver chain 206, the baseband IC 302 also comprises the PDCCH decoder component 340 (not shown in FIG. 9) operably coupled to the DCI decoder 342 (also not shown in FIG. 9), which is also operably coupled to the resource assignment store 344 in order to write uplink resource allocation data and the associated subframe identifier to the register 344, the uplink resource allocation data relating to a subframe subsequent to a current subframe in accordance with the LTE standard. In this example, the subcarrier mapping unit 702 is capable of accessing the resource assignment store 344. In operation, (FIGS. 6 and 10), as described above in relation to downlink communications, the receiver chain 206 monitors the PDCCH by the PDCCH decoder component 340 decoding (Step 500) the PDCCH to obtain downlink control information that is specific to the UE unit 200 and the DCI decoder 342 decodes (Step 502) the downlink control information in order to obtain resource assignment data associated with uplink communications, for example uplink resource allocation data, identifying the resource elements to be used by the UE unit 200 for uplink communications. In this respect, for uplink resource allocation by the eNode B 104, the DCI decoder 342 writes (Step 504) via the uplink/downlink control data interface 404 of the digital interface 306 the uplink resource allocation data and the associated subframe identifier to the resource assignment store 344. The DCI decoder 342 then awaits (Step 506) a next subframe before repeating the above-described decoding and parsing process (Steps 500, 502) to obtain the uplink resource allocation data. Typically, the procurement of the uplink resource allocation data occurs before the UE unit 200 needs to transmit uplink data.

As will be appreciated, uplink resource allocation data associated with a current subframe will have been written to the resource assignment store 344, in this example, four subframes previously. Therefore, whilst the above process of receiving and decoding downlink control information is being performed, uplink resource allocation data does not need to be awaited and so, referring to FIG. 10, the baseband IC 302 can modulate (Step 800) a block of M data bits (using, in this example, a Quadrature Amplitude Modulation (QAM) scheme) onto a carrier signal at a zero centre frequency using a data mapper (not shown) and a waveform generator (also not shown) of the upstream baseband processing unit 700 of the baseband IC 302. The upstream baseband processing unit 700 then subjects the modulated carrier signal to a discrete Fourier transform (Step 802) by a digital Fourier transform unit (not shown) to generate a set of M equally-spaced adjacent subcarriers of amplitude and phase that correspond to the QAM waveform repetitively, occupying a bandwidth of M×15 kHz in accordance with the LTE standard. The set of adjacent subcarriers is then communicated (Step 804) via the data channel 305 of the digital interface 306, to the subcarrier mapping unit 702.

Thereafter, the subcarrier mapping unit 702 accesses the resource assignment store 344 in order to determine to what resource elements received subcarriers should be mapped for the current subframe, the relevant entry of the resource allocation store 344 containing the subframe identifier. The subcarrier mapping unit 702 then maps (Step 806) the adjacent subcarriers received onto part of a larger set of N subcarriers constituting the expanded space of N subcarriers mentioned above and that span the full bandwidth as specified in accordance with the LTE standard, i.e. resource elements identified by the uplink resource allocation data. After mapping, the full set of N subcarriers is subjected to an unused subcarrier zero padding process (Step 808) by the subcarrier zero padding unit 704 in order to comply with FFT size requirements and a need to insert valid data into subcarriers unallocated with respect to the resource allocation data, and then the padding-processed subcarriers are subjected to an inverse fast Fourier transform (Step 810) by the IFFT unit 706 to generate parallel time-domain digital waveforms. Hence, as can be seen in this example, the subcarrier processing component 318 is arranged to convert between the collapsed space of subcarriers and the expanded space of subcarriers. Moreover, in this example, the conversion between the collapsed space of subcarriers and the expanded space of subcarriers in accordance with the resource allocation data is a predetermined tone and subcarrier correspondence assigned in accordance with the Orthogonal Frequency Division Multiplexing communications scheme.

The digital time domain waveforms are converted (Step 812) from a parallel format to a serial format by the parallel-to-serial converter unit 708 to yield a serial digital waveform. As the cyclic prefix needs to be created from the last P samples of the serial digital waveform, the data that would be used to generate the cyclic prefix is read out of the parallel-to-serial converter 708 and communicated first, i.e. before the rest of the serial digital waveform, from the parallel-to-serial converter 708 to the cyclic prefix addition unit 710. Subsequently the remaining non-cyclic prefix-related data of the serial digital waveform, is sent from the parallel-to-serial converter 708 to the cyclic prefix addition unit 710. The last N-samples of the serial digital waveform are therefore received by the cyclic prefix addition unit 710 before the rest of the samples of the serial digital waveform and processed by the cyclic prefix addition unit 710. In this respect, as the LTE standard supports more than one length of cyclic prefix, and so the cyclic prefix addition unit 710 needs to be provided with the length of the uplink cyclic prefix to be used in order to perform the above processing of the samples of the serial digital waveform. Consequently, the protocol software component 348 has access to System Information Block data via the PDSCH, in particular SystemInformationBlockType2 data, from which the protocol software component 348 extracts the length of the uplink cyclic prefix to be used. The protocol software component 348 then writes (Step 814) the length of the uplink cyclic prefix being used to the uplink cyclic prefix register 716 via the uplink/downlink control data interface 404. The length of the uplink cyclic prefix to be used is then retrieved from the uplink cyclic prefix register 716 by the cyclic prefix addition unit 710. The cyclic prefix addition unit 710 then, on a per symbol basis, stores in the buffer a respective copy of the last P-samples of the serial digital waveform of a given symbol being received, the amount of data stored being selected in accordance with the retrieved length of the uplink cyclic prefix from the uplink cyclic prefix register 716. Thereafter, once the samples sent from the parallel-to-serial converter 708 have been completely received by the cyclic prefix addition unit 710, the stored part of the received symbol is retrieved from the buffer by the cyclic prefix addition unit 710 and appended (Step 816) to the end of the last sample received in respect of the given symbol in order to complete the given symbol. Thereafter, the signals constructed by the cyclic prefix addition unit 710 are converted (Step 818) from the digital domain to the analogue domain by the digital-to-analogue converter 712 and then the analogue signal output is up-converted (Step 820) by the up-converter mentioned above in relation to the remainder of the RF processing circuitry 714 to form an RF signal. The up-converted RF signal is then amplified (Step 822) by the power amplifier also mentioned above in relation to the remainder of the RF processing circuitry 714 before being applied to the duplexer 208 prior to emission by the antenna 210.

Figure 11:
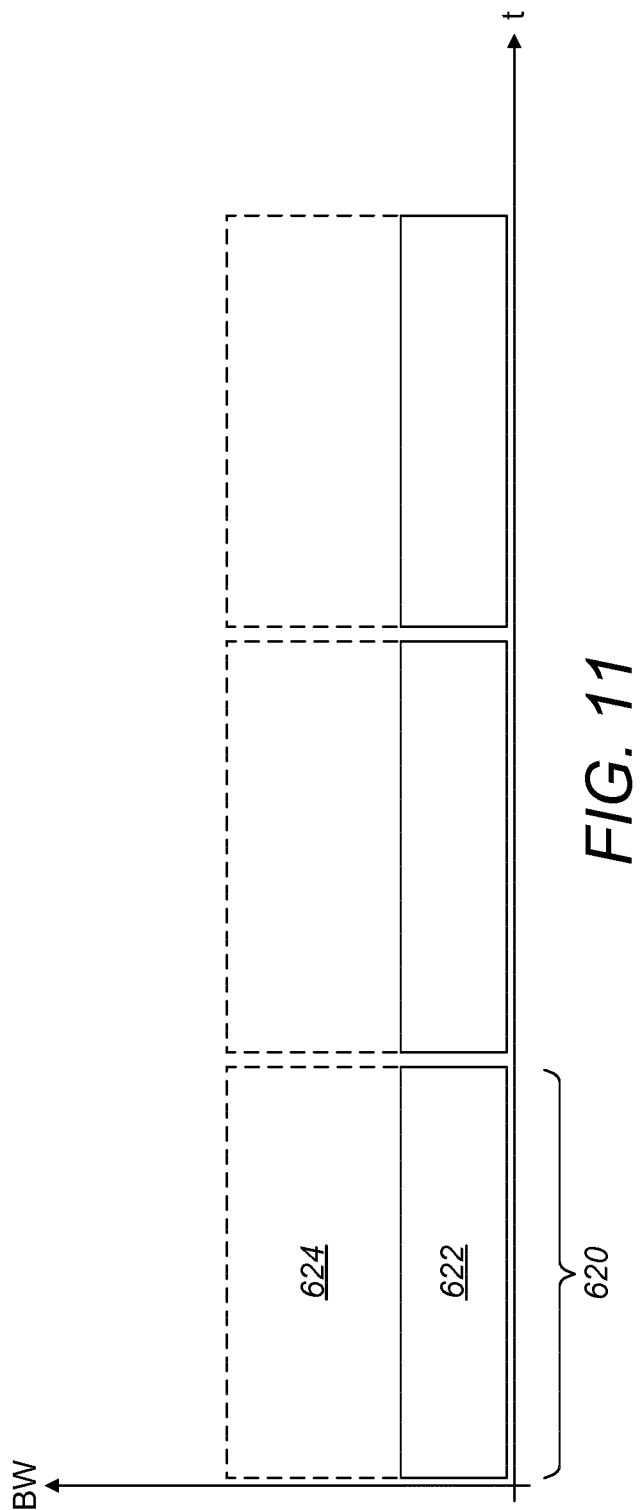
FIG. 11 is another graph of bandwidth usage vs time in respect of uplink communications and the modem apparatus of FIGS. 8 and 9.

Referring to FIG. 11, as can be seen by virtue of disposing the subcarrier processing components, for example the subcarrier mapping unit 702 and the unused subcarrier zero padding unit 704 on the RF IC side of the digital interface 306 and, more particularly, the RF IC 304 comprising the subcarrier mapping unit 702 and the unused subcarrier zero padding unit 704, the larger set of N subcarriers spanning the full bandwidth of the LTE standard, does not need to be communicated across the data channel 305 of the digital interface 306. In this respect, for each subframe 620, a reduced amount of data 622 is communicated across the data channel 305 of the digital interface 306 as compared with a larger amount of data 622+624 that would need to be communicated across the data channel 305 of the digital interface 306 were the subcarrier mapping and subcarrier zero padding to be performed by the baseband IC 302. Furthermore, as can be seen, there is no latency in application of the bandwidth reduction measure described above, because the uplink resource allocation data in respect of the current subframe is sent in advance of the current subframe in accordance with the LTE standard.

This is further exemplified by Table II below, which compares data transfer rates where subcarrier processing is performed by the baseband IC 302 with data transfer rates where subcarrier processing is performed on the other side of the digital interface 306 in the RF IC 304. The calculated bandwidth saving is also provided.

TABLE II

| BW (MHz) | Sampling Frequency (MHz) | One OFDM Symbol | | | | Transfer rate/ subframe(ms) | | IQ Interface BW Savings (%) |
|---|---|---|---|---|---|---|---|---|
| | | A | B | C | D | E | F | |
| Max Allocation (All Subcarriers allocated to the UE) | | | | | | | | |
| 20 | 30.72 | 2048 | 1200 | 848 | 14 | 30720 | 16800 | 45.31% |
| 15 | 23.04 | 1536 | 900 | 636 | 14 | 23040 | 12600 | 45.31% |
| 10 | 15.36 | 1024 | 600 | 424 | 14 | 15360 | 8400 | 45.31% |
| 5 | 7.68 | 512 | 300 | 212 | 14 | 7680 | 4200 | 45.31% |
| 3 | 3.84 | 256 | 180 | 76 | 14 | 3840 | 2520 | 34.38% |
| 1.4 | 1.92 | 128 | 72 | 56 | 14 | 1920 | 1008 | 47.50% |
| Min Allocation (only 12 Subcarriers allocated to the UE) | | | | | | | | |
| 20 | 30.72 | 2048 | 12 | 2036 | 14 | 30720 | 168 | 99.45% |
| 15 | 23.04 | 1536 | 12 | 1524 | 14 | 23040 | 168 | 99.27% |
| 10 | 15.36 | 1024 | 12 | 1012 | 14 | 15360 | 168 | 98.91% |
| 5 | 7.68 | 512 | 12 | 500 | 14 | 7680 | 168 | 97.81% |
| 3 | 3.84 | 256 | 12 | 244 | 14 | 3840 | 168 | 95.63% |
| 1.4 | 1.92 | 128 | 12 | 116 | 14 | 1920 | 168 | 91.25% |

A - FFT size;
B - Allocated subcarriers;
C - Guard subcarriers;
D - Symbols/msec
E - Reduced rate – subcarriers/subframe;
F - Standard LTE samples/subframe It should be noted that, where a handover is instructed between eNode Bs, the protocol software component 348 extracts cyclic prefix length information in respect of a target eNode B of the handover procedure, the cyclic prefix length information being obtained during the synchronisation procedure between the UE unit 200 and the target eNode B. In a like manner to that described above, the length of the uplink cyclic prefix being used by the target eNode B is written to the uplink cyclic prefix register 716 via the uplink/downlink control data interface 404.

It should be appreciated that, in the current LTE standard, multiple lengths of cyclic prefix exist, the cyclic prefix selected being dictated by propagation consideration. In this example, the cyclic prefix processing unit is responsive to the content of the uplink cyclic prefix register 716, which contains an indication of which of the available cyclic prefix lengths the modem should use for transmission of data. The cyclic prefix processing unit stores data in the buffer to be used to complete a symbol, because the last P-samples of the symbol are sent in advance by the baseband IC 302 and now (in addition to prefixing the samples of the symbol) require appending to the end of the remaining samples of the symbol received.

In order to ensure that the cyclic prefix stored in the uplink cyclic prefix register 716 is current, the protocol software component 348 can be arranged to refresh the cyclic prefix length information stored in the uplink cyclic prefix register 716 in response to receipt by the UE unit 200 of a timing advance command from a current eNode B.

The skilled person should appreciate that the above-described implementations are merely examples of the various implementations that are conceivable within the scope of the appended claims. Indeed, the skilled person should appreciate that descriptions herein of the transmitter chain 204 and the receiver chain 206 in combination are not intended to be limiting in the sense that a modem can comprise only the transmitter chain 204 and the receiver chain 206, and a modem comprising one or the other of the transmitter chain 204 and the receiver chain 206 is contemplated.

Similarly, various references have been made herein to "converter" units. The precise meaning of this term differs depending upon specific context. However, at a general level, a converter unit is a unit that converts an input from a first domain to a second domain, for example from an analogue domain to a digital domain, such as an analogue-to-digital converter. Another example of the converter component is a digital to analogue converter. However, formats should also be considered as "domains", for example parallel and serial data formats should be considered as domains, and in this regard parallel-to-serial converters and serial-to-parallel converters are examples of "converters" between these domains. Further examples of domains are frequency and time domains, and in this regard the FFT and IFFT units are examples of "converters" between frequency and time domains.

By way of a further example of different implementations, it should be appreciated that other techniques to achieve subcarrier mapping exist and are contemplated as applicable to the above examples with suitable adaptation, for example so-called semi-persistent scheduling. However, it should be appreciated that such an approach does not obviate the need to monitor the PDCCH.

Although, in the above examples, reference has been made to two cyclic prefix lengths only as defined in the LTE standard. It should be appreciated that the control information can support communications standards that employ more than two prefix lengths, for example three of more different lengths of cyclic prefix. Alternatively, where a single cyclic prefix is employed in the communication system, the cyclic prefix length can be stored locally in the RF IC 304 without the need for specific communication from the BB IC 302.

In relation to the digital interface, at a functional level, it should be understood that the digital interface interfaces between the baseband processing components and the Radio Frequency processing components to support communication of data between a notional node associated with the remainder of the receiver chain 324 or the upstream baseband processing unit 700 and a notional node associated with the output of the subcarrier demapping unit 322 or the input of the subcarrier mapping unit 702, depending upon whether reference is being made to the transmitter chain or the receiver chain.

Throughout the examples described about, the term "unit" has been used in relation to components of the baseband IC 302 and the RF IC 304. However, the skilled person should appreciate that the terms "unit" and "component" can be used interchangeably herein.

As can be seen from the above examples, the third converter can be one or more components that generate Fourier transforms and/or inverse Fourier transforms and constitute examples of Fourier computation components. Hence, a Fourier computation component can be a Fourier transform component or an inverse Fourier transform component, for example a Fast Fourier transform component or an inverse Fast Fourier transform component, respectively. The Fourier transform component can be embodied by a Digital Fourier transform component or an inverse Digital Fourier transform component.

For the avoidance of doubt, use of the term "downlink" refers to communications from an eNode B to a UE unit. The UE unit 200 therefore possesses, in the examples set forth herein, a downlink receiver chain. Similarly, use of the term "uplink" refers to communications from a UE unit to an eNode B. The UE unit 200 therefore possesses, in the examples set forth herein, an uplink transmitter chain.

The systems and methods of the above embodiments may be implemented in a computer system (in particular in computer hardware or in computer software) or in specifically manufactured or adapted integrated circuits, in addition to the structural components and user interactions described.

The methods of the above embodiments may be provided as computer programs or as computer program products or computer readable media carrying a computer program which is arranged, when run on a computer or other processor, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While specific examples of the invention have been described above, the skilled person will appreciate that many equivalent modifications and variations are possible. Accordingly, the exemplary embodiments of the invention set forth above are considered to be illustrative and not limiting. Various changes to the described embodiments may be made without departing from the spirit and scope of the invention.

The invention claimed is:

1. Modem apparatus for wireless network access in accordance with an Orthogonal Frequency Division Multiplexing (OFDM) communications scheme, the apparatus comprising:

Radio Frequency processing components comprising:
   a converter component configured to convert signals between time and frequency domains in accordance with the OFDM communications scheme;
   a subcarrier processing component operably coupled to the converter component, and configured to convert between a collapsed space of subcarriers and an expanded space of subcarriers in accordance with resource assignment data, wherein:
      the expanded space of subcarriers comprises a first plurality of subcarriers over a system bandwidth, and
      the collapsed space of subcarriers comprises a second plurality of subcarriers, the number of second subcarriers being less than or equal to the number of first subcarriers; and
   a cyclic prefix processing component configured to process cyclic prefix data;
baseband processing components comprising a channel estimation component; and
a digital interface coupled to the subcarrier processing component and the channel estimation component.

2. The apparatus according to claim 1, wherein the converter component comprises a Fourier computation component.

3. The apparatus according to claim 1, wherein the baseband processing components comprise:
   a channel equalisation component operably coupled to the channel estimation component; and
   a Physical Downlink Control Channel decoder component operably coupled to the channel equalisation component.

4. The apparatus according to claim 3, comprising a downlink control information decoder configured to obtain the resource assignment data from downlink control information of a Physical Downlink Control Channel.

5. The apparatus according to claim 4, wherein the subcarrier processing component comprises an allocated resources selector sub-component comprising a subcarrier input,
   wherein the allocated resources selector sub-component is configured to identify only wanted subcarriers from amongst unwanted subcarriers in response to receipt, at the subcarrier input, of subcarriers comprising the wanted and unwanted subcarriers, the wanted subcarriers being defined by the resource assignment data.

6. The apparatus according to claim 5, wherein the downlink control information decoder is configured to communicate the resource assignment data to the subcarrier processing component.

7. The apparatus according to claim 4, wherein the subcarrier processing component is configured to identify only wanted subcarriers from amongst unwanted subcarriers.

8. The apparatus according to claim 4, wherein:
the baseband processing components comprise the downlink control information decoder, r and
the downlink control information decoder is configured to communicate the resource assignment data via a control channel of the digital interface.

9. The apparatus according to claim 7, comprising:
a protocol software component configured to identify a subcarrier bearing a reference signal.

10. The apparatus according to claim 9, wherein:
the protocol software component is configured to identify the subcarrier to the subcarrier processing component, and
the wanted subcarriers includes the identified subcarrier.

11. The apparatus according to claim 5, wherein:
the subcarrier processing component comprises a demapping sub-component operably coupled to the resources selector sub-component;
the demapping sub-component is configured to receive the wanted subcarriers from the resources selector sub-component; and
the demapping sub-component is configured to de-map the wanted subcarriers in accordance with the resource assignment data.

12. The apparatus according to claim 11, comprising a buffer operably coupled to an input of the demapping sub-component.

13. The apparatus according to claim 4, wherein the resource assignment data comprise downlink resource allocation data.

14. The apparatus according to claim 4, wherein the subcarrier processing component comprises a mapping sub-component configured to:
receive the resource assignment data;
receive symbols via the digital interface; and
map the received symbols in accordance with the resource assignment data.

15. The apparatus according to claim 14, wherein the resource assignment data comprise uplink resource allocation data.

16. The apparatus according to claim 14, wherein:
the subcarrier processing component comprises a subcarrier padding sub-component operably coupled to the first converter component; and
the subcarrier padding sub-component is configured to insert zero padding data in respect of subcarriers unallocated with respect to the resource assignment data.

17. The apparatus according to claim 1, comprising a transceiver, the transceiver comprising the Radio Frequency processing components, the baseband processing components, and the digital interface.

18. The apparatus according to claim 1, wherein:
the first plurality of subcarriers over the system bandwidth comprises a first plurality of equally spaced subcarriers, and
the second plurality of subcarriers comprises a second plurality of equally spaced subcarriers.

19. The apparatus according to claim 1, wherein:
the first plurality of subcarriers over the system bandwidth comprises a first plurality of equally spaced adjacent subcarriers, and
the second plurality of subcarriers comprises a second plurality of equally spaced adjacent subcarriers.

20. A method of processing subcarriers in modem apparatus for wireless network access in accordance with an Orthogonal Frequency Division Multiplexing (OFDM) communications scheme, the method comprising:
converting signals between time and frequency domains in accordance with the OFDM communications scheme;
converting the subcarriers between a collapsed space of subcarriers and an expanded space of subcarriers in accordance with resource assignment data, wherein:
the expanded space of subcarriers comprises a first plurality of subcarriers over a system bandwidth, and
the collapsed space of subcarriers comprises a second plurality of subcarriers, the number of second subcarriers being less than or equal to the number of first subcarriers;
processing cycling prefix data;
generating a channel estimate by a channel estimation component; and
communicating processed data between a subcarrier processing component and the channel estimation component.

* * * * *